Patented Jan. 20, 1925.

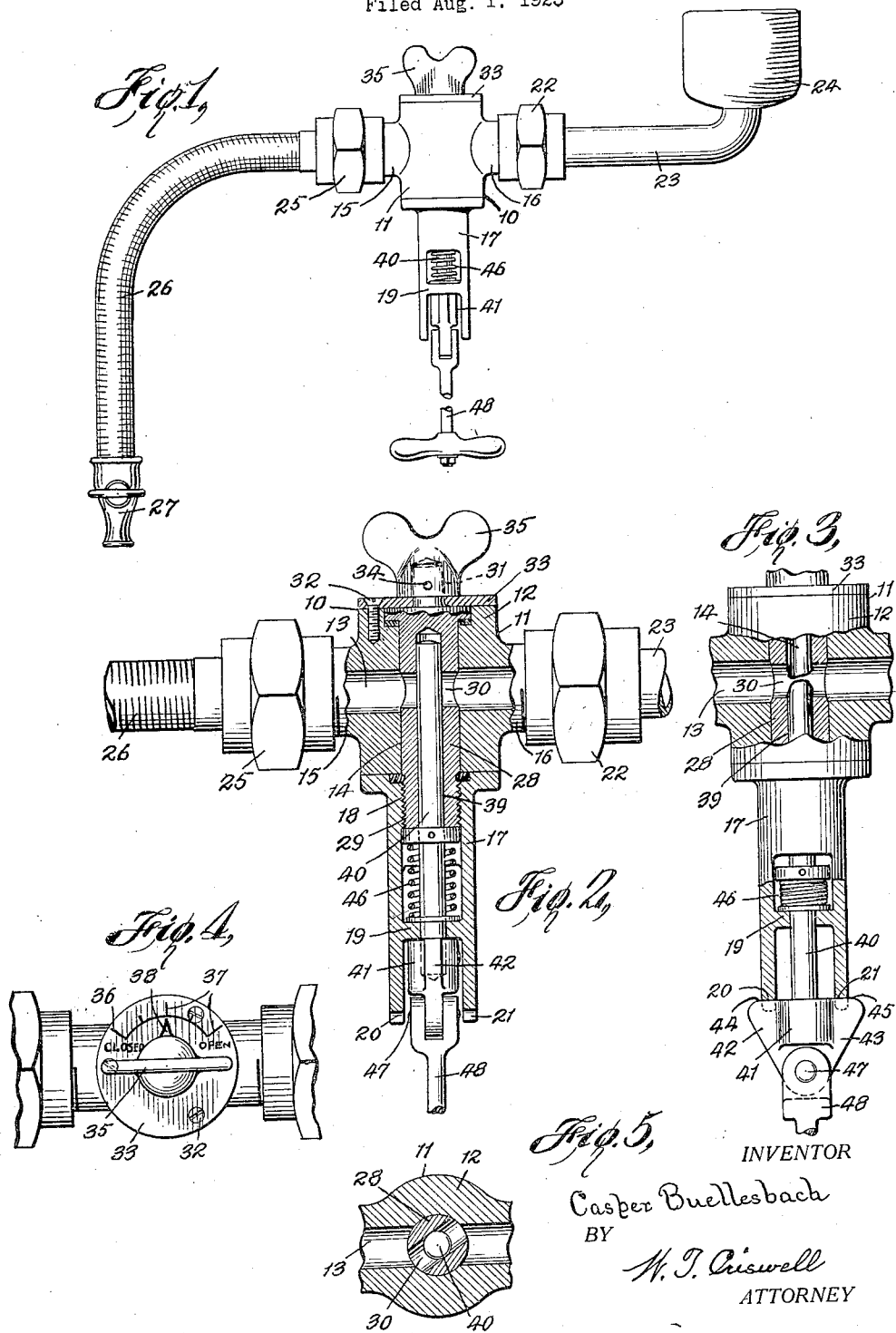

1,523,750

UNITED STATES PATENT OFFICE.

CASPER BUELLESBACH, OF NEW YORK, N. Y.

LUBRICATING DEVICE.

Application filed August 1, 1923. Serial No. 655,031.

*To all whom it may concern:*

Be it known that I, CASPER BUELLESBACH, a citizen of the United States, and a resident of New York, in the county of New York and State of New York, have invented certain new and useful Improvements in a Lubricating Device, of which the following is a full, clear, and exact specification.

This invention relates more particularly to a class of devices for lubricating purposes.

My invention has for its object primarily to provide a device designed to be employed for feeding to shafting and parts of machinery a lubricant and for discharging water or other cooling liquid on tools and grinding wheels when in use in a manner whereby the lubricant or liquid may be so regulated that a determined quantity will be delivered continuously for desired periods, and which is of a portable type to allow of being arranged at suitable localities for operation. The invention consists essentially of a casing having communicating longitudinal and vertical passages. Leading into one end of the longitudinal passage is the outlet of a tank or receptacle for holding a lubricant or cooling liquid, while from the other end of the passage leads a pipe through which the contents of the tank is discharged, and this pipe may be flexible to allow of being disposed for delivering the contents in various directions relative to the position of the tank and casing. In the vertical passage of the casing is a rotative valve having a duct which is registrable with the rotatable adjustment of the valve for regulating the opening and closing of the passage, and in the lower end of the valve is a socket communicating with and extending across the duct. A spring controlled rotative plunger is reciprocally adjustable inwardly and outwardly of the socket for opening and closing the passage through the duct to admit and cut-off the flow of the lubricant to the delivery pipe. On the plunger is a fixed stop head so that when the plunger is pulled outwardly of the socket of the valve to open the passageway through the duct the stop head and plunger are rotatively moved to cause engagement of the stop head with the casing for releasably locking the plunger against inward movement of the socket of the valve, in order to permit a regulated continuous discharge for desired periods of the lubricant or cooling liquid from the delivery pipe.

A further object of the invention is to provide a lubricating device of a simple, efficient and durable construction which may be made in any appropriate shape and size.

With these and other objects in view, the invention will be hereinafter more fully explained with reference to the accompanying drawing forming a part of this specification in which similar characters of reference indicate corresponding parts in all the views, and will then be pointed out in the claims at the end of the description.

In the drawing, Figure 1 is a side elevation, partly broken away, of one form of lubricating device embodying my invention.

Fig. 2 is an enlarged fragmentary view, showing a detail section taken through the feed controlling valve used in the device, the cut-off parts of the valve being in closed position.

Fig. 3 is an enlarged fragmentary view, partly broken away, showing the cut-off parts of the valve in open position.

Fig. 4 is an enlarged fragmentary view, showing a top plan of the valve, and

Fig. 5 is an enlarged fragmentary sectional view taken transversely through the upper part of the valve and which shows the valve proper in partly open position.

The device has a casing 10 which may be of any suitable shape and size, though the form of the casing illustrated has a body 11 with a cylindrical wall 12, and in the body are communicating longitudinal and vertical passages, as 13 and 14. Extending in opposite directions from the body are exteriorly threaded annular flanges or bosses, as 15, 16, having their passages leading into the longitudinal passage 13, and on the underside of the body is a depending tubular stem 17 having its passage leading into the lower end of the vertical passage 14. The upper part of the tubular stem 17 may be interiorly threaded, as at 18, and spaced from the lower end of the stem is an interiorly annular flange 19, while in opposite parts of the lower free edge of the stem and under the bosses 15, 16 may be registered notches, as 20, 21.

To the threaded boss 16 of the body 11 of the casing is fastened by means of a nut 22 the inlet pipe, as 23, leading from a tank or receptacle, as 24, for holding a desired quantity of lubricant or liquid for lubricating shafts or parts of machinery or for cooling tools and grinding wheels when in use. To the threaded boss 15 of the body 11 of the casing is fastened by means of a nut 25 one end of a delivery pipe, as 26. This delivery pipe is preferably flexible to permit of being bent in various directions relative to the position of the casing 10 and the tank 24, as will be hereinafter more fully explained, and on the other end of the pipe 26 may be provided a suitable valve controlled nipple, as 27.

In the vertical passage 14 of the body 11 of the casing is a rotative valve 28 of a length so that its upper end terminates at the upper end of the passage 14 while its exteriorly threaded lower end, as 29 extends into and is screwed in the threads 18 of the stem 17 of the casing. In the central part of the valve 28 is a passage or duct 30 which is registrable in part or in entirety with the longitudinal passage 13 of the body of the casing when the valve is accordingly rotated for regulating the flow of the liquid content from the tank 24 to the delivery pipe 26. Projecting from the upper end of the valve 28 beyond the casing may be a lug, as 31, and on the upper end of the body of the casing surrounding the lug 31 may be fastened, at 32, a plate or disk, as 33. On the lug 31 is held, at 34, a finger nut, as 35, to permit the valve 28 to be manually rotated. On the disk 33 may be a scale, as 36, having indicia, as 37, and projecting from the nut 35 may be a pointer, as 38, adapted when the nut and valve 28 are rotated to register with the indicia 37 so that the open or closed or partially closed position of the duct 30 relative to the longitudinal passage 13 of the casing may be indicated for permitting proper regulation of the feed of the lubricant to the discharge pipe 26.

In the valve 28 is a socket 39 extending from the lower end of the valve upwardly across and in communication with the duct 30. The diameters of the socket 39 and duct 30 are approximately similar, and in the socket 39 is reciprocably and rotatively disposed the upper end portion of a plunger 40 which serves as means for opening and closing the passageway through the duct 30 and through the longitudinal passage 13 of the casing. The plunger 40 is of a length so that its lower end movably extends through the opening of the annular flange 19 of the stem 17 of the casing, and fixed on the lower end of the plunger is a stop head, as 41 leaving two oppositely disposed flanges or wings, as 42, 43, which are relatively disposed so that their upper edges 44, 45, respectively, are on alinement. These wings are also of thicknesses to permit of being removably seated in the registered notches 20, 21 of the tubular stem 17 of the casing 10. Encircling the part of the plunger 40 in the portion of the tubular stem 17 between the annular flange 9 and the lower end of the valve 28 is a spring 46 tensioned for normally forcing the plunger 40 upwardly in the socket 39 for normally closing the passageway through the duct 30, and the stop head 41 is positioned on the plunger so that the wings 42 and 43 limit the inward movement of the plunger in the socket by engaging the underside of the annular flange 19 of the stem 17. Pivoted, at 47, to the head 41 may be a suitable handle, as 48, for allowing the plunger 40 to be pulled outwardly of the socket 39 of the valve 28 and outwardly of the tubular stem 17 as well as being subsequently rotatably adjusted.

In practice the device is stationarily arranged at a suitable locality above shafting or machinery or above drilling tools or grinding wheels, and the flexible pipe 26 is bent so that the lubricant or cooling liquid from the tank 24 may be fed from the nipple 27. By rotating the nut 35 the valve 28 will be revolved to partly or entirely register the duct 30 with the longitudinal passage 13 of the casing 10 for allowing the desired supply of the contents of the tank to flow through the passage 13 to the delivery pipe 26, and the desired regulation of the feed of the contents will be indicated by the pointer 38 on the scale 36. The handle 48 may then be manipulated for pulling the plunger 40 outwardly of the socket 39 of the valve against the tension of the spring 46 to open the passageway of the duct 30 of the valve 28. When the stop head 41 is clear of the tubular stem 17, the head and plunger may be partly revolved for removably seating the edge parts 44, 45 of the wings 42, 43 of the head in the notches 20, 21 of the tubular stem. The plunger will thereby be releasably locked in position to retain open passageway through the duct 30 for permitting continuous discharge of the lubricant or cooling liquid for desired periods.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. A casing for a lubricating device, having communicating longitudinal and vertical passages, a rotative valve in the vertical passage of the casing, having a duct registrable with the longitudinal passage when the valve is rotated for regulating the opening and closing of the passage and the valve having in its lower end a socket extending across and in communication with the duct, a spring controlled rotative plunger reciprocally adjustable inwardly and outwardly of the socket for opening and closing the passage through the duct, means whereby said rotative valve may be rotated to any extent, and means whereby said plunger may be reciprocated to open or closed position regardless of the position of the rotative valve.

2. A casing for a lubricating device, a rotative valve in the vertical passage of the casing, having a duct registrable with the longitudinal passage when the valve is rotated for regulating the opening and closing of the passage and the valve having in its lower end a socket extending across and in communication with the duct, a spring controlled rotative plunger reciprocably adjustable inwardly and outwardly of the socket for opening and closing the passage through the duct, and a stop head fixed on the plunger, having a handle to permit moving the plunger outwardly of the socket of the valve to open the duct and to subsequently rotate the head into engagement with the casing for releaseably locking the plunger against inward movement of the socket of the valve.

3. A casing for a lubricating device, having communicating longitudinal and vertical passages, a rotative valve in the vertical passage of the casing, having a duct registrable with the longitudinal passage of the casing when the valve is rotated for regulating the opening and closing of the passage and the valve having in its lower end a socket extending across and in communication with the duct, a handle for rotatably adjusting the valve to control the registration of the duct with the passage of the casing, a spring controlled rotative plunger reciprocably adjustable inwardly and outwardly of the socket for opening and closing the passage through the duct, and a stop head fixed on the plunger, having a handle to permit moving the plunger outwardly of the socket of the valve to open the duct and to subsequently rotate the head into engagement with the casing for releasably locking the plunger against inward movement of the socket of the valve.

4. A casing for a lubricating device, having communicating longitudinal and vertical passages, a rotative valve in the vertical passage of the casing, having a duct registrable with the longitudinal passage of the casing when the valve is rotated for regulating the opening and closing of the passage and the valve having in its lower end a socket extending across and in communication with the duct, a handle for rotatably adjusting the valve to control the registration of the duct with the passage of the casing, a scale on the casing for indicating the position of the valve and its duct relative to the longitudinal passage of the casing, a spring controlled rotative plunger reciprocably adjustable inwardly and outwardly of the socket for opening and closing the passage through the duct, and a stop head fixed on the plunger, having a handle to permit moving the plunger outwardly of the socket of the valve to open the duct and to subsequently rotate the head into engagement with the casing for releasably locking the plunger against inward movement of the socket of the valve.

This specification signed and witnessed this 31st day of July, A. D. 1923.

CASPER BUELLESBACH.

Witnesses:
S. CRISWELL,
FREDERICK CRYER.